United States Patent

[11] 3,593,561

| [72] | Inventor | Josef Roth |
| | | 13694 Settlement Acres Drive, Brookpark, Ohio 44142 |
| [21] | Appl. No. | 774,753 |
| [22] | Filed | Nov. 12, 1968 |
| [45] | Patented | July 20, 1971 |

[54] DIE PRESS PRODUCT EJECTION
6 Claims, 5 Drawing Figs.

[52] U.S. Cl. ...................................................... 72/427, 83/82
[51] Int. Cl. ................................................ B21d 45/00, B26d 7/06
[50] Field of Search ........................................ 72/427, 345; 100/218; 83/82, 101, 135, 160

[56] References Cited
UNITED STATES PATENTS
3,030,834  4/1962  Anderson .................... 72/427 X
2,755,759  7/1956  Roberts ....................... 72/427 X
2,693,159  11/1954 Taylor ......................... 100/218 X
1,797,239  3/1931  Newman ...................... 72/427

Primary Examiner—Charles W. Lanham
Assistant Examiner—R. M. Rogers
Attorney—Sughrue, Rothwell, Mion, Zinn & Macpeak ABSTRACT: An ejecting mechanism for a die press that utilizes the vertical motion of the ram to create a linear sweep of an ejecting plate across the face of the die bed. The ejecting mechanism provides a simple mechanical arrangement of parts which transforms the vertical motion of the ram into a linear motion of a carriage carrying the plate. The carriage is adjustably designed to carry a bouncer plate which both lifts and propels small articles falling from the raised die or a puller plate which pulls articles onto its face and out of the die area.

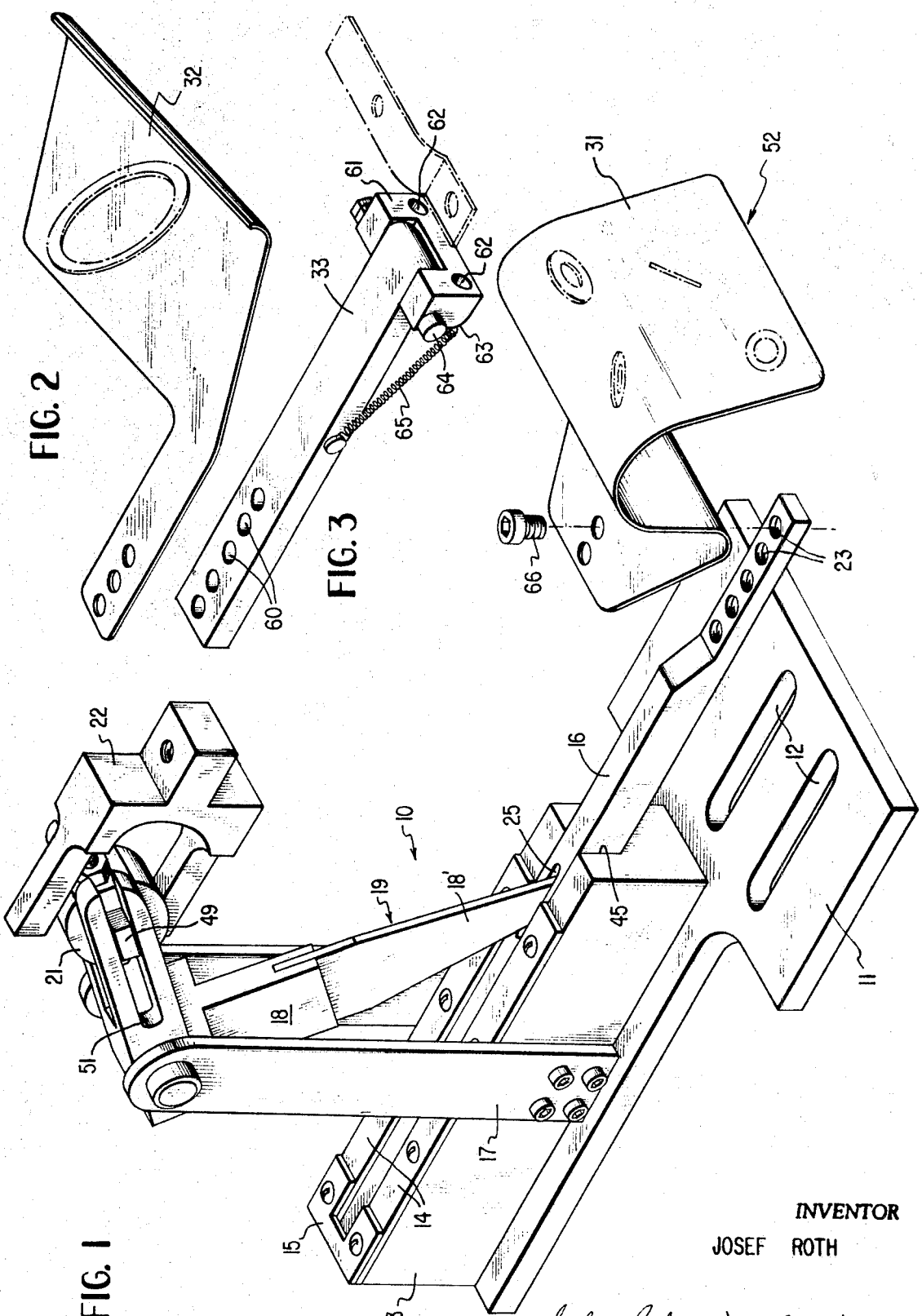

INVENTOR
JOSEF ROTH

BY Sughrue, Rothwell, Mion, Zinn & Macpeak
ATTORNEYS.

DIE PRESS PRODUCT EJECTION

This invention relates, in general, to a die press for shaping articles from sheet blanks, and more specifically, to a novel way of ejecting the articles formed by the press.

In the formation of articles by a die press, it is desirable to remove the articles formed quickly and efficiently from the bed of the press. Modern presses generally have their movable die reciprocating at high speeds, therefore, by necessity, the formed article must be quickly and positively removed from between the dies before the ram comes into contact with the bed of the die press. If the article is not removed, it will be damaged or destroyed by the descending ram and possibly even cause damage to both the die plates and the die press itself.

The state of the art has generally evolved from highly complex mechanical ejection means to the general use of singular or composite jets of air. The proficiency of using jets of air for ejecting formed articles depends upon the number of articles formed, their size and shape, and their weight. The use of air jets has required the addition of an accompanying source of compressed air. This has not always proved economical or satisfactory to the demands of the industry.

It is, therefore, an object of the present invention to provide a relatively simple mechanical ejecting means which is operated by and in coordination with the reciprocating movement of the ram and its related parts.

Another object is to provide a simple mechanical ejecting means that is capable of performing the same functions as the more complexed mechanical devices of the prior art. A further object is to provide an ejecting means which can be quickly and easily modified to accommodate the particular article presently being formed in the die press. This is particularly helpful where inventory or production needs require only a limited number of a particular article to be formed, yet the economic demands of the manufacturer limit him to a set number of die press machines.

Still another object of the invention is to provide the ejecting means with a number of plate heads, each adapted to perform proficiently with a formed article of a particular size and weight.

Other objects of the invention will be pointed out in the following description and claims and illustrated in the accompanying drawings, which disclose, by way of example, the principle of the invention and the best mode which has been contemplated of applying that principle.

IN THE DRAWINGS

FIG. 1 is a perspective view of the ejecting mechanism with a bouncer plate shown removing small washers.

FIG. 2 is a perspective view of a puller plate for removing large gaskets, etc.

FIG. 3 is a perspective view of a pusher plate for removing formed articles.

Figure 4:
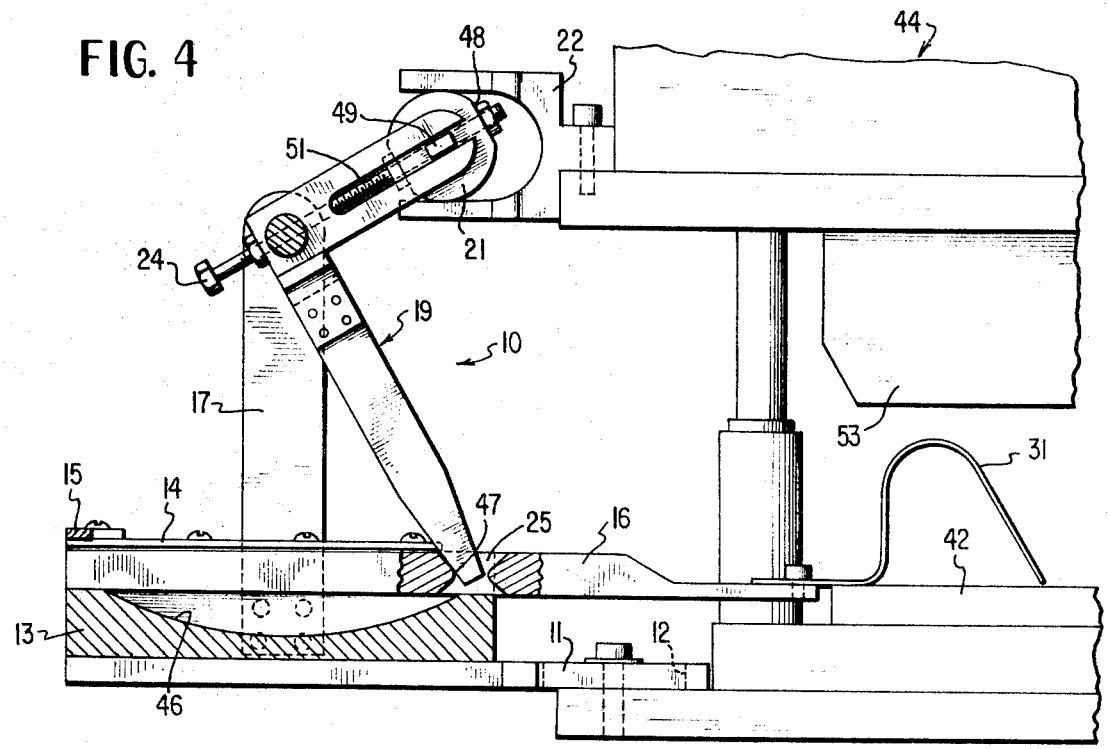
FIG. 4 is a fragmentary, vertical elevation of the die press illustrating the present invention with the bouncer plate in its extended position over the guide bed.

Referring to FIG. 1, the ejecting mechanism 10 is provided with a baseplate 11 containing two elongated slots 12 for adjustably attaching the ejecting mechanism to the table or base 43 of the die press 44. The ejecting base body 13 is attached to the baseplate 11 and has a rectangular recessed guideway or slot 45 which extends throughout the entire top portion of the base body for carrying the carriage 16. In addition, underlying the central portion of the guideway is a curved recess 46 best seen in FIGS. 4 and 5 for accommodating the reciprocal motion of the L-shaped, sectional lever 19. Guide cover plates 14 restrict any vertical motion of the carriage 16, while carriage stop plate 15 prevents an overtravel of the carriage 16 by limiting the rearward movement of the lever 19. The carriage 16 has a slot 25 which accommodates the end 18' of lever 19. The carriage slot 25 is designed to permit the tip end of lever 19 to extend into and through the carriage as the carriage reciprocates from one end of its travel to the other. Both ends 47 of the slot have a pair of tapered slopes which extend from the center of the carriage to the top and bottom of the carriage. This slot provides a simple mechanical means of transforming the oscillating motion of the lever 19 into a linear motion of the carriage 16.

Figure 5:
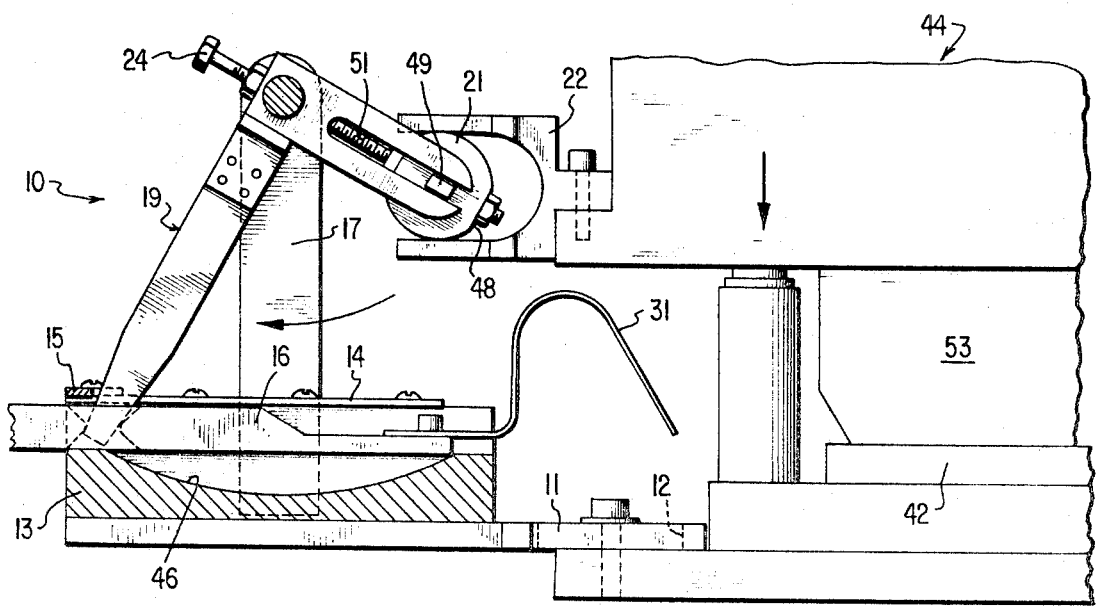
FIG. 5 is a similar elevation view of the die press with the bouncer plate being shown in its retracted position when the die press is forming an article.

The lever section 18 is pinned to the fixed upright arms 17 extending from the base body 13 and carries the circular bearing member 21. The circular bearing member 21 is adjustably mounted between the furcations of the forked end of a supporting member 18. The circular bearing member is a cylinder with a planar section 48 on its nonbearing portion to accommodate its adjustable mounting bolt 24. The top and bottom of the cylinder support a pair of rectangular studs 49, which allow a radial adjustment of the distance of the circular bearing member 21 to the pinned axis of the lever section 18. The rectangular studs 49 are adjustably movable in a pair of guideways 51 which extend along the radial portion of the support at an angle with the lever section 19. A U-shaped bracket 22 is removably mounted on the reciprocating ram of the die press and serves to transmit the vertical motion of the ram via the circular bearing member and lever 19 to the carriage 16. As seen in FIGS. 4 and 5, the circular bearing member is adjustably mounted between the furcations of the forked end of the support 18 by an adjusting screw 24. This arrangement allows the ejecting mechanism to accommodate differences in the down stroke of various presses.

The forward end of the carriage 16 is provided with a plurality of adjusting holes 23 for mounting an assortment of plates. FIG. 1 illustrates the bouncer plate 31 being mounted on the forward end of the carriage 16. The bouncer plate has a tendency to vibrate or oscillate as it crosses the face of the die bed 42. This motion and its inclined forward face will cause the formed articles to not only move in a horizontal direction, but also to be propelled upwardly, to bounce the articles away from the die bed as they fall from the upwardly moving die member 53.

The bouncer plate is generally formed of sheet metal and is provided with a resilient inclined, leading surface 52. The particular embodiment of the bouncer plate disclosed utilizes a serpentine cross-sectional configuration to provide inherent resiliency. This novel motion of the bouncer plate assures the complete removal of all the articles formed in a single cycle of the die press.

The carriage end is adapted to carry other plate heads, for example, puller plate 32 illustrated in FIG. 2. The puller plate has a slight vertical slope which extends from the die bed side to a terminating lip. The combination of the slight slope and the linear motion of the carriage 16 tends to slide articles falling from the upper die press member along the inclined surface until they come into contact with the terminating lip. When the puller plate stops and begins to reverse direction, the formed articles will slide down and off the face of the puller plate outside of the path of the upper die member.

FIG. 3 illustrates yet another plate head, in this case, puller plate 33. The puller plate comprises a rectangular bar of metal carrying a plurality of spaced holes 60 allowing adjustment in longitudinal position with respect to reciprocating carriage 16, to which it is attached. At the outer end of the pusher plate, there is provided a U-shaped, pivotally mounted striker 61 carrying threaded holes 62 allowing attachment of a thin striker plate (not shown) providing a larger contact area, depending, of course, upon the articles being manufactured by the die press. The bottom surface of the U-shaped striker 61 is curved at 63 and a pair of mounting pins 64 allow the striker 61 to be pivotally coupled to the pusher plate 33 for pivoting about the horizontal axis defined by the pins. In this respect, coil spring 65 has one end coupled to the side of the pusher head 33 and the other end to the U-shaped striker 61 below the axis of pivot pin 64, such that the striker 61 is always biased with its forward face perpendicular to the plane of movement of the pusher plate. During operation, the striker 61 contacts the formed articles during their flight from the upper die member as it moves upwardly with respect to the fixed bed 42. Both the end of the carriage and the various plate heads have complementary adjustable mounting means in the form of longitudinally spaced holes along the axis of movement of the carriage for accommodating suitable fastening means, such as the mounting bolt 66, FIG. 1. With the striker 61 pivotally supported during return movement of the carriage and the pusher plate 33, if the bottom or curved surface 63 of the striker should contact the workpiece as it is being inserted between upper die member 53 and lower die 42, the U-shaped striker 61 pivots against the bias of spring 65 due to the frictional restraint between these members without adverse affect to either the workpiece in sheet form or the striker 61. Normally, of course, with respect to all three embodiments, there is no contact between the pusher plate, the bouncer plate or the puller plate as they move in between the upper die member 53 and the lower die member 42 to move articles falling, by gravity, from the upper die member, as shown in FIGS. 1 and 2.

The operation of the improved ejecting mechanism of the present invention is illustrated sequentially in FIGS. 4 and 5. FIG. 4 shows the base plate 11 of the ejecting mechanism attached to the die base 43 to provide a stationary support. While the U-shaped bracket 22 is attached to the ram to transmit the vertical motion of the ram by way of the circular bearing member 21, support 18 and the lever 19 to the carriage 16 and its plate head which, in this case, is the bouncer plate 31. FIG. 4 shows the ram in its raised position with the bouncer plate 31 completing its sweep over the die bed 42. FIG. 5 shows the ram coming in contact with the die plate to form whatever articles the press is manufacturing, while the bouncer plate has been removed clear of the ram to its retracted position. It should be realized that the sweep or linear movement of the bouncer plate relative to the die bed can be adjusted by virtue of the slots 12, adjusting holes 23 in the carriage, and adjusting screw 24. The drawings provided are merely illustrative of one form of the invention.

Having thus described my invention, I claim:

1. An ejecting mechanism for use with a reciprocating die press or the like including a reciprocating ram movable toward and away from a stationary bed, said ejecting mechanism comprising:
   an L-shaped operating lever,
   means for mounting said lever for pivotable movement about an axis passing through the intersection of the lever arms,
   a circular bearing carried by one of said arms,
   a guide slot carried by said press, said guide slot receiving said circular bearing for transforming reciprocating motion of said press to rotary oscillation of said lever,
   a carriage mounted for reciprocation relative to the stationary bed of said die press and having a slot intermediate of its ends for receiving the other arm of said lever,
   ejecting plate means attached to the carriage and coordinated with movement of the ram to sweep the die area of any formed articles,
   slot means carried by said one lever arm,
   stud means extending outwardly from said circular bearing and received within said slot means to guide said bearing along said lever arm, and
   lockable adjusting means carried by said lever for adjusting the position of said circular bearing along the length of said arm.

2. The ejecting mechanism as claimed in claim 1, wherein said lockable adjusting means comprises a threaded adjustment screw slidingly carried by said one arm and fixedly coupled to said circular bearing, and a lock nut threadably carried by said screw for locking said adjusting screw relative to said one lever arm.

3. An ejecting mechanism is recited in claim 1, wherein the ejecting plate means comprises a bouncer plate attached to said carriage, said bouncer plate being formed of spring metal and terminating in a U-shaped bent portion defining a resilient, inclined surface to propel formed articles forward and upward as the bouncer plate sweeps the die area clear of the same.

4. An ejecting mechanism as recited in claim 2 wherein the plate means includes the puller plate having a slightly sloping face lying above the die bed and terminating in an upturned lip, and means for coordinating movement of the carriage and the ram to urge a formed article to slide up the slope of the puller plate face upon contact therewith and to slide down and off the puller plate as it stops and reverses direction.

5. An ejecting mechanism as recited in claim 1 further including means for adjustably connecting the plate head means for adjustably connecting the plate head means to the carriage to vary the sweep of the plate head means to meet the various requirements of the die press.

6. An ejecting mechanism as recited in claim 1 further comprising a pair of slopes carried by the carriage slot and extending through the carriage, one pair of slopes at each end of said slot and extending outwardly from the center of the carriage, whereby said other lever arm, by extending through the carriage, causes reciprocation of the same during movement in a circular path whereby said carriage is directly motivated in opposite directions during cyclic operation of the die press.